(12) United States Patent
Dartez et al.

(10) Patent No.: US 11,318,426 B1
(45) Date of Patent: May 3, 2022

(54) SUBMERSIBLE AERATOR

(71) Applicants: James Dartez, New Orleans, LA (US); Wyatt Kennair, New Orleans, LA (US)

(72) Inventors: James Dartez, New Orleans, LA (US); Wyatt Kennair, New Orleans, LA (US)

( * ) Notice: Subject to any disclaimer, the term of this patent is extended or adjusted under 35 U.S.C. 154(b) by 0 days.

(21) Appl. No.: 16/877,585

(22) Filed: May 19, 2020

(51) Int. Cl.
*B01F 3/04* (2006.01)
*C02F 7/00* (2006.01)

(52) U.S. Cl.
CPC ........ *B01F 3/0412* (2013.01); *B01F 3/04106* (2013.01); *B01F 2003/04134* (2013.01); *B01F 2003/04198* (2013.01); *B01F 2003/04872* (2013.01); *C02F 7/00* (2013.01)

(58) Field of Classification Search
CPC .................. B01F 3/04; B01F 3/04106; B01F 2003/04191
See application file for complete search history.

(56) References Cited

U.S. PATENT DOCUMENTS 9,968,895 B1 * 5/2018 Dartez ............... B01F 3/04248

\* cited by examiner

*Primary Examiner* — Robert A Hopkins
(74) *Attorney, Agent, or Firm* — Kenneth L Tolar

(57) ABSTRACT

A submersible aerator includes a hollow cylindrical housing having an open upper end, an open lower end and a hollow interior. An air supply hose extends from an air supply source into the upper end of the housing and terminates at an air outlet, immediately above the lower end of the housing. Attached to the interior surface of the housing outer wall are a series of vertically spaced, oppositely facing baffle plates that provide impact surfaces to cleave rising air bubbles into smaller bubbles. A weep hole is formed on the outer surface of the air supply hose, equidistantly positioned between each adjacent pair of baffle plates. Accordingly, excess air pressure will be relieved via the weep holes as opposed to the lower end of the housing to protect nearby external equipment.

10 Claims, 2 Drawing Sheets

SUBMERSIBLE AERATOR

CROSS REFERENCE TO RELATED APPLICATIONS

None.

BACKGROUND OF THE INVENTION

The present invention relates to a submersible aerator for treating wastewater.

DESCRIPTION OF THE PRIOR ART

Handling and treating wastewater has always been challenging and difficult. Fats, grease, oils and similar insoluble materials are particularly problematic because although most float, they sometimes cling to form larger masses that can sink to any location beneath the water's surface. The larger, submerged materials are more difficult to transport and can damage pumps, piping, valves and other equipment if not removed.

A common wastewater treatment technique involves turbulent mixing or agitation to fragment the larger insoluble materials into smaller masses that will float. Air injection is widely considered to be an effective means of not only mixing or agitating wastewater, but also for aerating the masses to create more buoyancy. As air bubbles rise to the surface of the wastewater, they collide with and breakdown waste material, which more easily accumulates on the water's surface. Once the insoluble materials are floating, they pose no risk to other equipment and are easily removable by wastewater pumps.

Portable, submersible air injectors are particularly desirable due to their reduced construction costs, easy installation and simple operation. One such portable device is disclosed in U.S. Pat. No. 9,968,895, the entirety of which is incorporated herein by reference. The device includes a cylindrical housing with an air supply hose centrally received therein. Spaced air baffles are attached to housing interior such that, when air is released from the supply hose at the bottom of the housing, air bubbles rise and collide with each baffle until reaching the water's surface. The repeated collisions and alternating directions create turbulence that fragments and oxygenates the water and larger insoluble masses. Though effective, the device can release air bubbles from the lower end of the housing when subjected to excess air pressure. The escaping air poses a risk to pumps in the area where the aerator is positioned. For example, the released air could cavitate a pump, causing significant damage to impellers and other internal components.

Accordingly, there is currently a need for a submersible aerator that effectively fragments and aerates insoluble waste materials while preventing inadvertent release of air to a wet well or tank bottom. The present invention addresses this need by providing a submersible aerator having apertures formed on an air supply hose, immediately beneath a predetermined number of baffles, for relieving excess air pressure.

SUMMARY OF THE INVENTION

The present invention relates to a submersible aerator comprising a hollow cylindrical housing having an open upper end, an open lower end and a hollow interior. An air supply hose extends from an air supply source into the upper end of the housing and terminates at an air outlet, immediately above the lower end of the housing. Attached to the interior surface of the housing outer wall are a series of vertically spaced, oppositely facing baffle plates that provide impact surfaces to cleave rising air bubbles into smaller bubbles. A weep hole is formed on the outer surface of the air supply hose, equidistantly positioned between each adjacent pair of baffle plates. Accordingly, excess air pressure will be relieved via the weep holes as opposed to the lower end of the housing to protect nearby external equipment.

It is therefore an object of the present invention to provide a submersible aerator that effectively fragments and oxygenates insoluble waste material.

It is therefore another object of the present invention to provide a submersible aerator that facilitates the transport of wastewater through a wastewater treatment system.

It is yet another object of the present invention to provide a submersible aerator having pressure-relief holes positioned on an air supply hose that prevent inadvertent air release from the bottom of the aerator into a wet well or other area containing vulnerable equipment.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
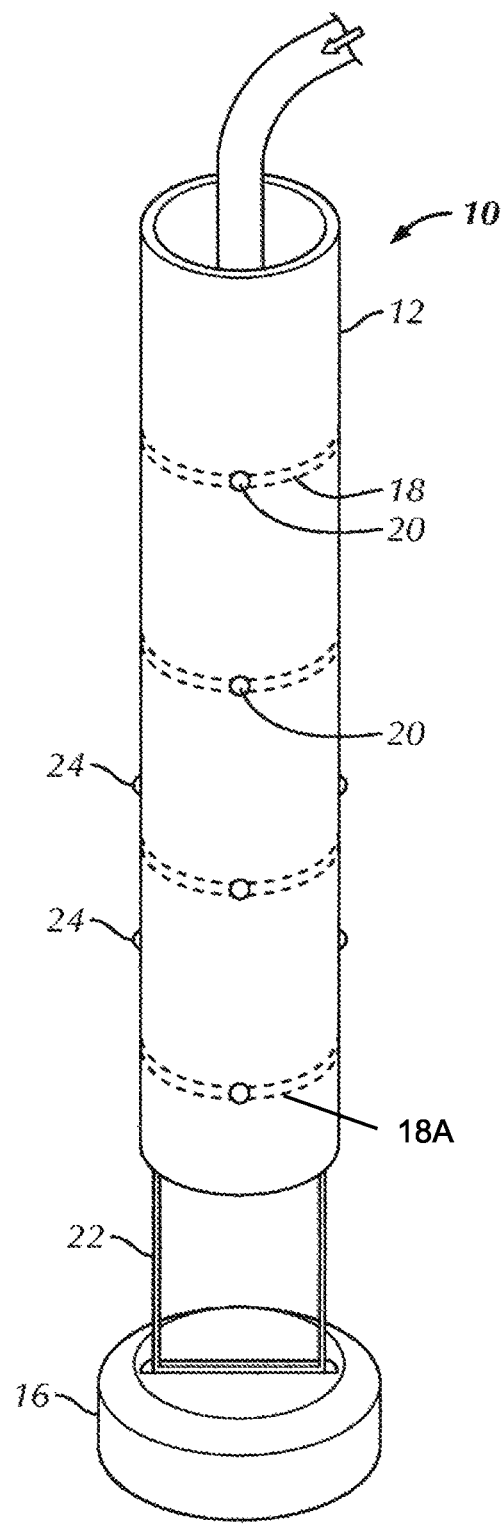
FIG. 1 is a perspective view of the submersible aerator according to present invention.

The present invention relates to a submersible aerator 10 that is particularly designed to be placed within a water transportation storage tank, a wet well or other container having wastewater requiring vigorous mixing. The aerator comprises a cylindrical housing 12 having an open upper end, an open lower end, a continuous outer wall and a hollow interior. A heavy-duty air supply hose 14 extends from an air supply source, such as a blower, into the upper end of the housing and terminates at an air outlet, immediately above the lower end of the housing. The hose is axially received within the housing interior and has sufficient rigidity and strength to support the weight of the other aerator components. Therefore, the hose may also function as a handle for raising, lowering or repositioning the aerator.

A support bracket 22 includes a pair of rails that are secured to the interior surface of the outer wall with rivets 24 or similar fasteners. In another alternative, the bracket could be attached to the outer surface of the housing. A weighted base 16 is attached to the lower end of the rails to ballast the housing in a vertical, upright position. The base could be constructed with concrete, stainless steel, lead or any other suitable heavy material. Preferably, the base weighs at least ten pounds though the weight can vary according to a particular application. The length of the rails are sufficient to elevate the lower end of the housing a predetermined distance above any sludge that has accumulated on the bottom of the tank or wet well. However, the lower end of the housing should be as near the upper surface of the accumulated sludge as possible to assure that injected air exiting the lower end engages as much suspended material as possible. Such positioning also assures that air bubbles exiting the hose will be somewhat large, which prevents the air hose from clogging.

Attached to the interior surface of the housing outer wall are a series of vertically spaced, oppositely facing baffle plates 18 that provide impact surfaces to cleave rising air bubbles into smaller bubbles. The creation of smaller bubbles increases turbulence and more effectively dismantles and aerates smaller insoluble waste masses that may be unaffected by larger bubbles. Each baffle plate 18 is substantially semicircular with a linear inner edge 50 and an arcuate outer edge 51. The arcuate outer edge includes threaded ports 26 for receiving bolts or screws 20 to secure the plate to the housing wall. The plate is dimensioned such that the linear inner edge is spaced from an opposing portion of the housing wall to create a flow path for rising air bubbles. Each baffle plate 18 includes an aperture 32 that is offset from the center and is closer to the inner edge than the outer edge. Each aperture on a baffle plate is axially aligned with the aperture of every other baffle plate for receiving and securing the air supply hose in a vertical orientation. A threaded port 28 extends from the inner edge 50 to the aperture 32 for receiving fasteners to secure the hose within each baffle plate.

Each baffle plate is positioned in an opposite direction relative to each preceding and succeeding baffle plate, i.e., the arcuate outer edge of the lowermost baffle plate 18A is attached to a first side of the housing while the arcuate outer edge of an adjacent baffle is attached to an opposing side of the housing. As such, the linear inner edges of the baffles will be staggered relative to the housing's central axis to create a jagged flow path for air bubbles as they rise toward the upper end of the housing. The lowermost baffle plate 18A is positioned immediately above the air hose outlet to assure that larger air bubbles exiting the hose are immediately broken up into smaller bubbles as they rise toward higher baffles. Therefore, as the largest air bubbles exit the hose, a majority impact the lowermost baffle plate 18A where they are fractured into smaller bubbles that migrate within the path formed between the inner edge and housing. Then, they collide with the next overlying baffle and are directed in an opposite direction through the pathway formed between the inner edge and an opposing portion of the housing. Accordingly, the oppositely facing baffle plates force the air bubbles to travel a sinuous path as they rise toward the water's surface. The repeated collisions and change of direction increase turbulence and continuously form smaller air bubbles along the flow path.

Each baffle plate preferably includes a notch 30 formed on its arcuate outer edge. The notch 30 allows a minimal amount of airflow through the baffle plate to create additional turbulence. In one embodiment, a notch 30 may be included in one or more lower baffle plates to accommodate the bracket rails while upper baffles may or may not include a notch.

Figure 2:
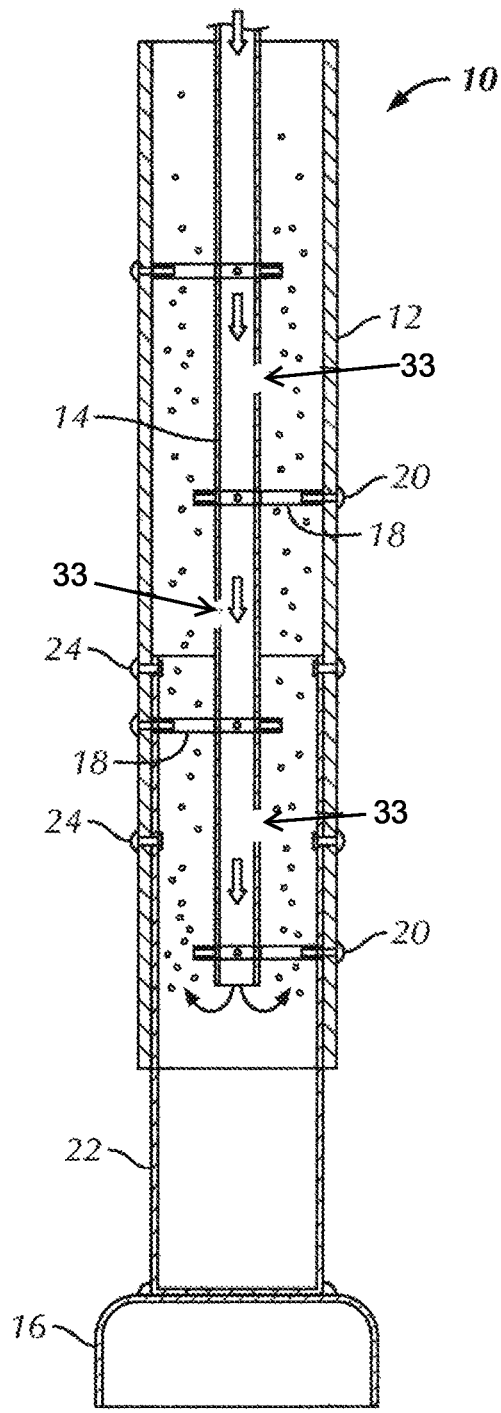
FIG. 2 is a side, cross-sectional view of the aerator depicted in FIG. 1.
Figure 3:
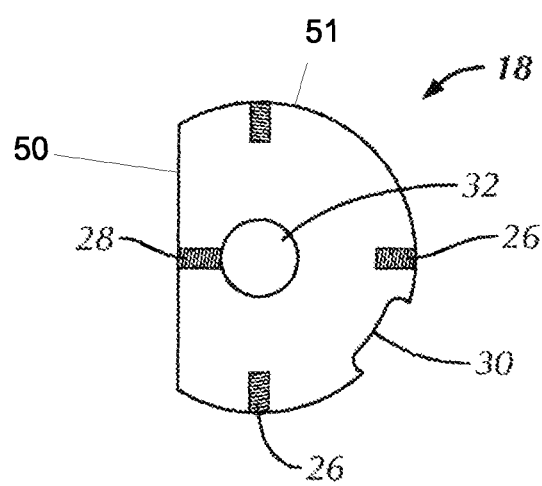
FIG. 3 is a top view of an exemplary baffle plate.
Figure 4:
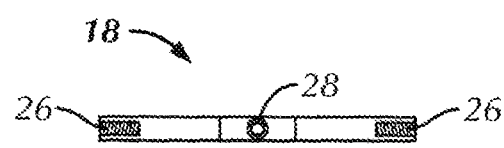
FIG. 4 is a side view of the baffle plate depicted in FIG. 3.

Now referring specifically to FIG. 2, a weep hole 33 is formed on the outer surface of the air supply hose at a position that is substantially equidistant from each adjacent pair of baffle plates. Each hole is preferably positioned beneath the linear inner edge of an overhead baffle plate. Accordingly, excess air pressure will be relieved via the weep holes as opposed to the lower end of the housing to protect nearby external equipment. In the preferred embodiment, three weep holes are formed, each approximately 3/16-1/4" in diameter though the size and number of holes can be varied according to a given application. In the preferred embodiment, the holes are formed between the lowermost baffle plate 18A, the second, the third and the fourth baffle plates, though the positioning of the holes relative to the baffle plates may also be varied.

The above-described device is not limited to the exact details of construction and enumeration of parts provided herein. For example, though the device has been primarily depicted and described as each baffle plate being oriented 180 degrees relative to an adjacent plate, the plates can be offset by 0 or 90 degrees. The placement of the threaded bores 26, 28 allows any desired baffle plate to be easily rotated 90 or 180 degrees and reattached to the housing. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A submersible aerator comprising:
   a cylindrical housing having an open upper end, an open lower end, a continuous outer wall and a hollow interior;
   at least two spaced baffle plates within the housing interior, each of said baffle plates having an outer edge attached to said outer wall and an inner edge spaced from said outer wall to form a flow path;
   an air supply hose extending through the open upper end of the housing, said air supply hose having an outlet positioned near the open lower end of said housing; said air supply hose having a weep hole positioned between the at least two spaced baffle plates to relieve excess air pressure within said hose.

2. The submersible aerator according to claim 1 further comprising:
   a bracket secured to the lower end of the housing;
   a weighted base attached to a lower end of said bracket for ballasting said housing.

3. The submersible aerator according to claim 1 wherein said inner edge is linear.

4. The submersible aerator according to claim 1 wherein said at least two baffle plates include said outer edge on alternate opposite sides of a vertical axis of said cylindrical housing.

5. The submersible aerator according to claim 1 wherein said weep hole is equidistantly positioned between said at least two spaced baffles.

6. The submersible aerator according to claim 1 wherein said weep hole is positioned on a portion of said air supply hose that is vertically aligned with the inner edge of said at least two spaced baffles.

7. A submersible aerator comprising:
   a cylindrical housing having an open upper end, an open lower end, a continuous outer wall and a hollow interior;
   at least four substantially semicircular, vertically spaced baffle plates positioned within said housing interior, each of said baffle plates having an arcuate outer edge fastened to said outer wall, and a linear inner edge spaced from said outer wall to create a flow path;
   an air supply hose extending through the open upper end of the housing and through each of said baffle plates, said air supply hose having an outlet positioned near the open lower end of said housing; said air supply hose having a weep hole positioned between each pair of adjacent vertically spaced baffle plates to relieve excess air pressure within said hose.

8. The submersible aerator according to claim 7 wherein said weep hole is equidistantly positioned between two baffle plates of said at least four substantially semicircular, vertically spaced baffle plates.

9. The submersible aerator according to claim 7 wherein said weep hole is positioned on a portion of said air supply hose that is vertically aligned with the inner edge of said pair of adjacent vertically spaced baffle plates.

10. The submersible aerator according to claim 7 wherein each arcuate outer edge of each of said semicircular, vertically spaced baffle plates is positioned on alternating opposite sides of a vertical axis of said cylindrical housing forming a serpentine flow path for air bubbles.

* * * * *